Nov. 26, 1963   V. W. SANDERS ETAL   3,111,975
AIRCRAFT TIRE TREAD
Filed Dec. 30, 1960

INVENTORS
VERNON W. SANDERS
EDWARD J. GEORGIA
ELWIN F. MAYEAU

BY
ATTORNEY

United States Patent Office 3,111,975
Patented Nov. 26, 1963

3,111,975
AIRCRAFT TIRE TREAD
Vernon W. Sanders, 934 Carolina St., San Francisco, Calif.; Edward J. Georgia, 3315 Waverly St., Palo Alto, Calif; and Elwin F. Maycau, 964 S. Norfield St., San Mateo, Calif.
Filed Dec. 30, 1960, Ser. No. 79,683
2 Claims. (Cl. 152—361)

This invention relates to treads on tires used on aircraft landing wheels. While relating more particularly to retreads on such tires, it is applicable also to treads used in the original construction of aircraft tires.

In an aircraft tire operating at speeds of 200 miles per hour or greater and under heavy load, there are terrific forces at work which tend to tear the tread from the tire body; and in retread construction particularly, the problem is one related to tread design and construction to withstand these dynamic forces. These forces are both the centrifugal force and the tread recovery force. The tread recovery force is of much higher magnitude than the centrifugal force and is the one with which we are primarily concerned in high speed aircraft tires. It is the force resulting from the tread's returning from its deflected form (sometimes referred to as the deflected radius) to its normal form, i.e., normal radius, as the tire leaves the footprint area. At low speeds of travel of the aircraft, the speed at which the tire separates from the running surface is slow, and the tire recovers its normal radius while still in contact with the running surface, i.e., before it completely leaves the footprint area, so that at the point of separation from the running surface, the tire possesses little or no radial velocity. But as the speed of travel of the aircraft increases, the speed at which the tire separates from the running surface becomes comparable with, i.e., tends to catch up with, so to speak, the velocity of recovery of the tire to its normal radius and a condition is reached wherein, towards the end of the recovery period of a given element of the tire, that element is unsupported and still has some radial velocity. Under these conditions, at the point of separation from the running surface, owing to the combined action of the elastic recovery forces of the tire and centrifugal force, the tire has considerable momentum in a radial direction. The portion of the tire involved vibrates as it moves away from the deflected area until the radial motion is dampened out. When the tire is moving at constant speed, each succeeding portion behaves in exactly the same fashion as its predecessor, giving rise to the formation of "standing waves," a status wherein the peripheral of the tire assumes a wave form which is stationary. Referring to this sinusoidal wave phenomenon in another way, when the speed of adjustment of the tire from its disformed state in contact with the running surface to an undeformed state (normal radius state) is too slow in comparison with the speed at which the tire leaves the running surface, there is a consequent buildup of compressions and distortions within the tread, as well as other erratic motions. The effect of all this internal friction, wave pattern, etc. is a large build-up of heat.

All this tread recovery force is directly related to tread mass, which, in turn, is determined by both specific gravity and volume of the material of which the tread is composed. In tire tread design for aircraft tires, the tread stock must be limited in depth to prevent this force from becoming so great that it will literally tear the stock apart. As the speed increases, it is, therefore, obvious that the mass (depth) must decrease if the force is not to be allowed to reach the danger point. On the other hand, the problem involves the matter of having a total tread depth such that there may be provided a sufficient skid depth to give reasonable wear and cut resistance and still be able to resist the forces tending to separate the tread from the tire body when operating under high speed conditions. By skid depth is meant the distance from the top surface of the tread to the bottom of the grooves and other surface design characteristics in the tire tread.

Notwithstanding that the high tread recovery forces are a factor of the amount of radial displacement through which the tire moves in entering and leaving the footprint area—increasing, as we have seen, as this radial displacement increases—the problem cannot be solved by the use of higher inflation pressure within the tire to reduce the amount of tire deflection for the reason that the permissible unit load on runways and the flotation characteristics insisted upon by aircraft designers impose limitations on operating pressure carried within the tires.

It is an object of this invention to provide a tread construction for aircraft tires which permits an increase in the normal skid depth of the conventional high speed tire for improved landing performance without sacrificing dependability and safety.

Another object is to effect an equalization of modulus between the body and the tread of the tire so as to distribute the stresses therebetween and thus improve the tire retention properties.

Another object is to provide a configuration and placement of reinforcement cord plies in the tread in a manner to check the formation of standing waves, which often occur in the tire under speeds of 200 or more miles per hour.

Another object is to permit the use of lower gravity and thus higher elastic rubber materials, thereby giving an improvement in resistance to cuts by small sharp pebbles becoming imbedded in the wear surface and resistance to groove cracking.

These and other objects and advantages of the invention will appear from the ensuing description and appended claims.

The invention is illustrated by way of example in the accompanying drawings and is described in detail hereinafter. The particular constructions shown and described are to be construed as illustrative only, and not as limiting the invention.

Figure 1:
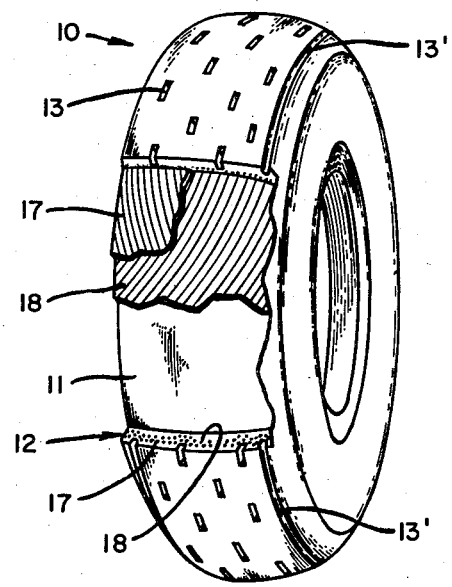
FIG. 1 is a perspective view of a retreaded aircraft tire embodying our invention, fragmentary parts of the material being cut and stripped away in different areas to expose the underlying structures as well as a cross-section of the tread.

Referring to the drawings, a retreaded aircraft tire for use on aircraft landing wheels, and designated generally as 10, is comprised of a body portion or carcass 11 and a retread portion, hereinafter sometimes referred to as the tread portion and sometimes simply as the tread, designated generally as 12. The width of the tread 12 will vary in accordance with the width of the crown and shoulders of the tire. In general, it extends laterally in both directions from the circumferential center line of the tire to the area on each side where the shoulder blends into the side wall. Generally also, the tread portions tapers in cross-sectional thickness where it blends into the side walls. For this reason, lower segments of the tread will be wider than the upper segments. Being a retreaded tire, the carcass 11 is of the conventional type as put out by the tire manufacturer that made the tire originally. In preparing the tire for retreading, such part of the tire manufacturer's tread originally on the tire which was not worn away through usage is suitably buffed off or otherwise sufficiently removed by conventional methods well known in the retreading of tires, and the retread portion 12 is bonded to the carcass 11. The tread 12 is made up of three different segments: a base tread segment 14 (FIG. 2) consisting of suitable resilient rubber material and occupying the lower portion of the tread 12, a top tread section 15 (FIG. 2) consisting of suitable resilient rubber material and occupying the upper portion of the tread 12, and a fabric reinforcement ply segment designated generally by 16 (FIG. 2), hereinafter more fully described, and occupying the position between the base tread segment and the top tread segment.

The base tread segment may vary in thickness generally from 3/32" to 5/32", depending on the size of the tire. Preferably, it is made by an extrusion operation, well known in the trade, rather than by calendering, since extruded treads are not subject to such manufacturing problems as air entrapment, blistering and erratic flow characteristics, which frequently occur in calendered treads. It is formed into strips of suitable width for application to the body of the tire. Likewise, the top tread section is preferably formed by extrusion and formed into strips of suitable width. Surface tread design features, such as the short grooves or slots 13 and the circumferential grooves 13', or other desired surface design characteristics, are put into the top tread section during the curing of said section, by well known methods, when it is in position on the tire and is being cured.

The fabric reinforcement ply segment 16 is made up of two cord plies 17 and 18 placed one on top of the other, each said ply being made up of fabric cords, preferably nylon, of .018" to .024" in diameter, suitably coated with a suitable rubber material, placed adjacent each other, and calendered to a ply thickness of preferably .063 inch, plus or minus .003 inch, with an end count preferably of 16 to 24 cord ends per inch of ply width. The calendered plies are cut into strips of suitable width in accordance with the width of the tread 12 at its mid depth, and with the longitudinal axis of the strips at an angle of 20 to 40 degrees with the direction of the cords in the plies. Thus, when the strips are positioned circumferentially on the aforesaid base tread segment of the tire, one ply strip being directly above and in contact with the other as hereinabove stated, but with the cords of one ply criss-crossing those of the other, the cords of each ply are at an angle from 20 to 40 degrees with the circumferential center line of the tire. Owing to the change in cross-section curvature at the shoulders of the tire, the width of the upper fabric ply strip applied to the tire is narrower than that of the lower ply. Thus, the cords of the upper ply are shorter than those of the lower ply, and the ends of the upper cords are accordingly positioned nearer to the center line at the crown of the tire than those of the lower cords, as will be seen in FIG. 2.

The fabric reinforcement plies 17 and 18 are positioned in the middle of the total tread portion 12, i.e., the circumferential center line midway between the two fabric cord plies is midway between the innermost and outermost circumferential center lines of the retreaded portion 12.

In the retreading operation, raw rubber stock, compounded with suitable vulcanizing and other necessary ingredients, in accordance wtih conventional practice, is used in preparing each of the segments which go to make up the total tread 12. When these segments are positioned in proper sequence in the tire, the structure is then subjected to heat and pressure in suitable molds and vulcanized—all in accordance with well known practice in tire manufacture and retreading practice. In this molding and vulcanizing process, the different segments are bonded together and the total tread structure bonded to the carcass or tire body.

The aforesaid dimensions given for cord diameters and ply thickness, and the number of cords per inch in width of plies are, as stated, our preferred relationships. We have found that they give an optimum amount of rubber material between the cords and between the ply layers for maximum riveting strength in a lateral and radial direction. In other words, these dimensions and relationships afford the placement of the imbedded cord material such that it is supported by an adequate amount of rubber material on all sides and becomes an integral part of the total tread for maxmium tie-down strength. By the use of only two reinforcement cord plies, which is one of the key features of our tread, one on top of the other, the total number of laminated sections is limited to four. One of the advantages in this over the use of a greater number of reinforcement plies is the reducing of the possibility of layer interface separation due to surface contamination or faulty application.

The placement of the reinforcement plies in the middle of the tread provides important characteristics in the tire.

The modulus of elasticity of the entire tread becomes more nearly equal to that of the casing or body of the tire, the reinforcement plies adding a rigidity to the tread which approximates the rigidity of the casing or tire body, thus permitting the tire body and tread to act together to resist the forces acting on the tire.

There is very much less dip in the direction of the cords in order for them to pass underneath the grooves or other design features in the tread. Where abrupt and sharp dips occur in the cord fibers, the forces to which the cords are subjected are intensified, giving rise to fatigue in the cords with resultant plucking and breaking of the cord fibers, often contributing to groove cracking as one of the side effects. In our construction, cord fatigue, with its deleterious effects, is substantially reduced.

Studies conducted by the National Aeronautics and Space Administration show that reinforcement tires wherein the top segment is all rubber have a higher coefficient of friction on wet runways than a tread with the outmost or top segment having reinforcement plies therein. Our construction permits operation of the tires on an all-rubber portion of the tread for a large part of the service life of the tire and thus contributes to shortening of the stopping distances of aircraft on wet runways.

With the reinforcement plies in the middle of the tread, the tire, for the greater part of its service life, will be wearing in the all-rubber part of the tread. This reduces the possibility of fabric edge fraying, resulting from taxi turns, and contributes to improved appearance and better psychological acceptance of the reinforced tread.

By placing the reinforcement plies in the middle of the tread and limiting their number to two, the wear resistance of the tread is increased, thus providing a greater number of landings during a given service life period than with multiplies dispersed throughout the tread mass. It is a well known fact that the abrasive resistance of rubber is greater than that of nylon fabric.

Ease of manufacture is enhanced in subsequent retreading of the casing when our tread construction is employed. Generally, the tire will be worn through the reinforcement plies when removed from the aircraft, thus permitting easy buffing of the lower all-rubber portion of the tread when preparing the tire for re-treading. Tires with a tread reinforcement ply adjacent the outmost segment of the casing necessitate buffing into the fabric and thus leave a surface of frayed undipped fabric which has marginal adhesive qualities.

Another important feature in the combination of structural elements comprising our reinforced tread is that wherein the angles which the cords in the two reinforcement plies make with the circumferential center line of the tire lie in the range of 20 to 40 degrees, and this together with having the cords of the two plies running in opposing directions, i.e., criss-crossing. This provides a highly restrictive medium of uniform elasticity closely approaching both the radial and the lateral strength of a squarely woven (i.e., warp and woof type) fabric while still providing sufficient free movement for flexing in both radial and all lateral directions. These bias cut reinforcing plies not only act as a restraining medium to the base rubber segment of the tread, but to the entire casing as well. Their restraining strength assists in resisting the formation of wave patterns which contribute to large heat build-up in the tread. The reducing of heat build-up decreases susceptibility to separation of tread from tire body. It also reduces susceptibility to cuts in the rubber by small pebbles.

Figures 2, 3:
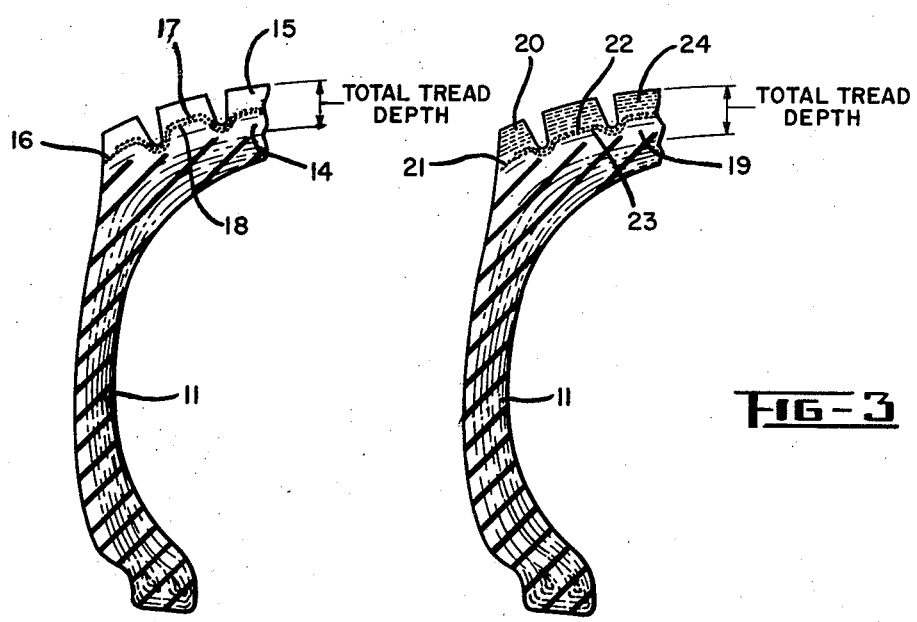
FIG. 2 is a fragmentary cross-sectional view of the tread portion of the tire shown in FIG. 1, the carcass or body of the tire being indicated in outline.
FIG. 3 is a cross-sectional view like that of FIG. 2, showing a modified structure of the tread.

In the modification shown in FIG. 3, the total tread thickness is likewise, as with the form shown in FIG. 2, composed of a base tread segment 19, a top tread segment 20, and a fabric reinforcement ply segment, designated generally as 21, positioned between the base segment 19 and the top segment 20. The base tread segment 19 is an all-rubber material varying in thickness, preferably from .062 to .125 inch. Being of these smaller thicknesses, it is prepared by calendering a suitable raw rubber stock. The structure of the fabric reinforcement ply segment 21 is identical with that hereinabove described for the tread shown in FIGS. 1 and 2, an upper ply 22 of cords being positioned on top of and in direct contact with a lower ply 23, the cords of one ply crisscrossing those of the other ply. The top tread section 20 is a calendered rubber material which has imbedded in it short pieces of fine wire 24 of miscellaneous lengths and thicknesses, which may vary in the neighborhood of from ½ to 1½ inches in length and from .005 to .007 inch in thickness. The quantity of such wire may range from about 12 to 20 percent by weight of the total weight of the completed top tread segment containing said wire aggregate.

This wire aggregate material 24 is placed in only the top section 20 of the tread. The fabric reinforcement plies 22 and 23, being positioned between the top segment 20 of the tread and the base tread section 19, perform the same function as that described hereinabove for the structure shown in FIGS. 1 and 2, but are assisted in the performance of that function by having the wire reinforcement aggregate material positioned in the top tread section 20, where it acts to equalize the modulus of elasticity of the outmost tread mass. The wire reinforcement material thus serves an additional function to that of providing a high coefficient of friction for operation on ice runways. There are, however, several other secondary advantages which flow from the presence of this wire material. It provides a rapid means for dissipation of the heat build-up in the tread due to internal friction from flexing, thereby providing a cool running tread. It acts as a barrier to penetration by foreign objects on the runway, thereby reducing the severity and degree of injuries from such objects. When the wire material is employed, the top segment 20 of the tread may be of somewhat greater thickness than the lower or base segment 19, so that the fabric reinforcement plies 22 and 23 may be positioned closer to the bottom of the grooves and other design features in the tread. The decrease in, or the elimination of the sharp dips in the cords, as the case may be, in the areas below the grooves makes for less fatigue in the cords, thereby increasing the resistance to groove cracking in the bottom of the ribs. In treads having only the wire reinforcement material, the tendency for groove cracking is found to be far greater than when the wire reinforcement feature is combined with our fabric reinforced plies.

We claim:
1. A pneumatic tire comprising a carcass having sidewalls, a tread portion and shoulder portions at the axially opposed sides of the tread portion, wherein said tread portion is defined by a base segment and a top segment with each of said segments being of substantially equal radial thickness and formed essentially of rubber material, and a reinforcing segment for the tread portion only of said carcass, said reinforcing segment being disposed substantially radially midway of the tread portion of the carcass intermediate the base and top segments thereof and terminating adjacent the shoulder portions, said reinforcing segment consisting of two plies each of which comprises only a single layer of nonmetallic cord material embedded in rubber, said plies being disposed in direct engagement with each other with the cords of each ply being disposed on the bias and extending at an acute angle relative to the circumferential center line of the carcass and with the cords of one ply extending at an opposite angle relative to the cords of the other ply.

2. The pneumatic tire as set forth in claim 1, wherein said tire is for use at high speeds such as is encountered during aircraft landing or takeoffs, said cords of each ply of the reinforcing segment of the tread portion of the carcass are each of approximately between .018 to .024 inch in diameter with the acute angle formed between the cords of the plies and the circumferential center line of the carcass being approximately between 20 to 40 degrees, and said plies of the reinforcing segment of the tread portion are each of approximately between .060 and .066 inches in thickness.

References Cited in the file of this patent

UNITED STATES PATENTS

| | | |
|---|---|---|
| 1,553,438 | Gauntt | Sept. 15, 1925 |
| 2,786,507 | Howe | Mar. 26, 1957 |
| 2,943,663 | Antonson | July 5, 1960 |
| 2,960,139 | Engstrom et al. | Nov. 15, 1960 |
| 3,052,274 | Lang | Sept. 4, 1962 |

FOREIGN PATENTS

| | | |
|---|---|---|
| 1,203,076 | France | July 27, 1959 |
| 3,623 | Great Britain | of 1915 |
| 789,770 | Great Britain | Jan. 29, 1958 |